(No Model.)  2 Sheets—Sheet 2.
R. T. & C. BELLEMEY.
VEHICLE WHEEL.
No. 597,938. Patented Jan. 25, 1898.
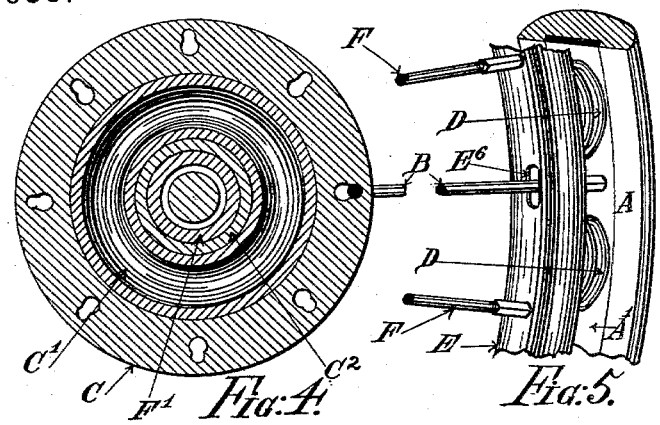
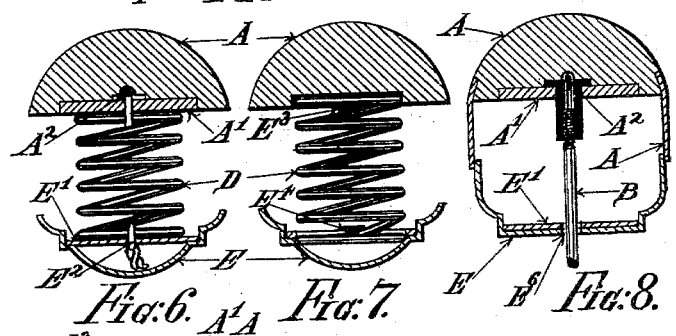
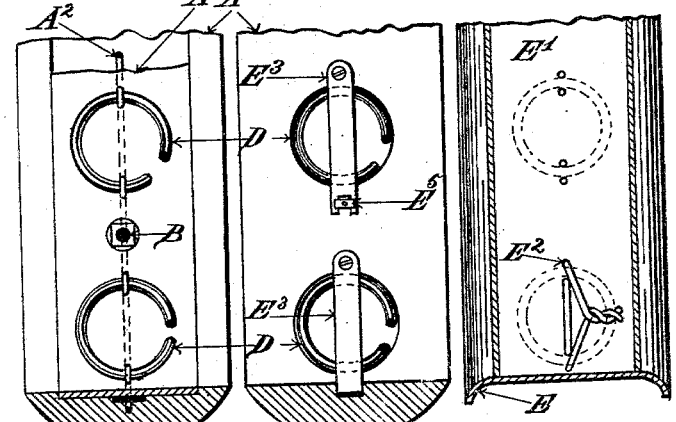
Witnesses.
Inventors.
Richard T. Bellemey,
Charles Bellemey.
By James L. Norris
Atty.
THE NORRIS PETERS CO., PHOTO-LITHO., WASHINGTON, D. C.

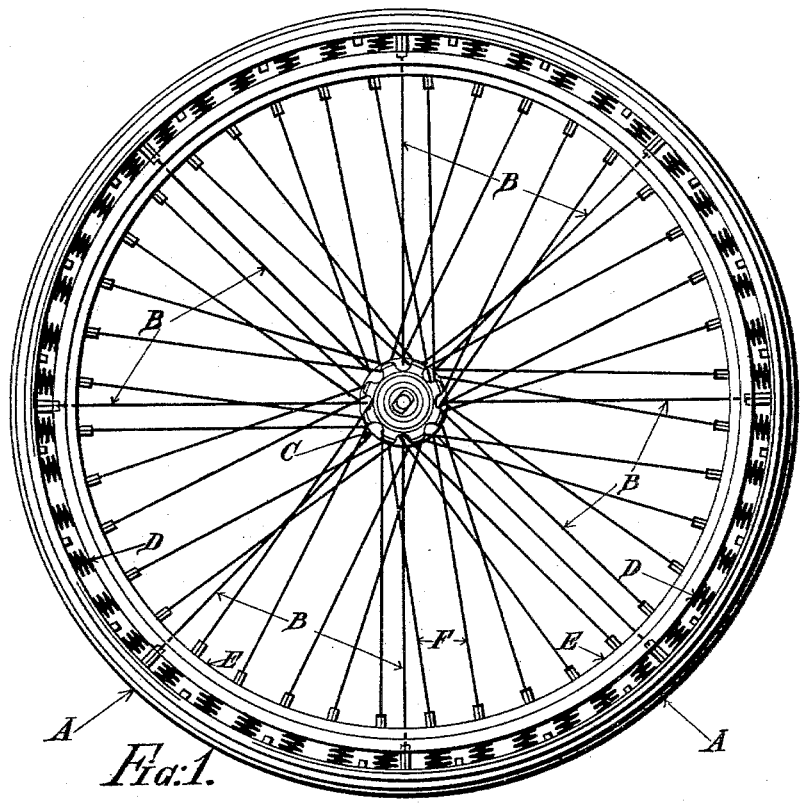
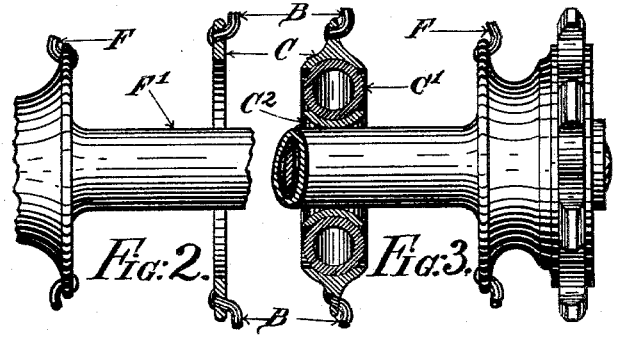

UNITED STATES PATENT OFFICE.

RICHARD THOMAS BELLEMEY, OF SYDNEY, AND CHARLES BELLEMEY, OF WOOLLAHRA, NEW SOUTH WALES.

VEHICLE-WHEEL.

SPECIFICATION forming part of Letters Patent No. 597,938, dated January 25, 1898.

Application filed February 16, 1897. Serial No. 623,635. (No model.)

*To all whom it may concern:*

Be it known that we, RICHARD THOMAS BELLEMEY, chemist, residing on King Street, Sydney, and CHARLES BELLEMEY, mechanical engineer, residing on Rush Street, Woollahra, near Sydney, in the British Colony of New South Wales, subjects of the Queen of Great Britain, have invented new and useful Improvements in Wheels for Cycles, Road-Vehicles, and the Like, of which the following is a specification.

This invention relates to certain improvements in wheels for cycles, road-vehicles, and the like by means of which there may be produced an efficient "spring" or flexible wheel—that is to say, a wheel whose construction will allow for the inequalities of the roadway without affecting or only slightly affecting the rider or riders or the passenger or passengers in the vehicles.

These improvements in wheels for cycles, road-vehicles, and the like consist principally in the peculiar construction of tire and its peculiar stiffening or bracing and method of adjustment concentrically with the rim and axle and the peculiar flexible connection or spring attachment to the rim of the wheel; but in order that this invention may be clearly understood reference will now be made to the drawings herewith, in which—

Figure 1 is a side elevation of a wheel constructed according to this invention, while Fig. 2 is an elevation, partly in section, of a piece or portion of the hub of said wheel, together with the central stiffening or bracing and adjusting ring of the tire. Fig. 3 is a similar view to Fig. 2, wherein a modification of the central stiffening or bracing and adjusting ring of the tire is shown. Fig 4 is a sectional elevation through the hub of the wheel and the stiffening or bracing and adjusting ring of the tire, as shown in Fig. 3. Fig. 5 is an elevation of portion of the rim and tire, showing the spring connection between the rim and tire of the wheel, as in Fig. 1. Fig. 6 is a cross-section through the rim and tire of the wheel shown in Fig. 1. Fig. 7 shows modified construction of the rim and tire and flexible connection. Fig. 8 is a section of the rim and tire, showing a modified construction of the rim and also covering-plates for the flexible connection and showing also the method of connecting the tire-spokes. Fig. 9 is a face view of the tire of the wheel as shown in Fig. 1. Fig. 10 is a similar view showing modified devices for fastening the flexible connections to the tire; and Fig. 11 is a face view of the attaching-band in the rim, showing the method of fastening a flexible connection or spring thereto.

The tire A is made of wood or iron or steel or like material and may have an outer facing or wearing-strip, if desired. As shown in the drawings, this tire A is made segment shape and of wood and it has stiffening-spokes or, as they will be hereinafter called, "tire-spokes" B, reaching inwardly to a ring or boss C, set centrally around the hub of the wheel. The spokes B are attached to this tire and to the central ring C in any well-known manner, so that they may be adjusted tensionally, and, as shown in Fig. 8, they have a screwed adjusting-nipple on the outer end. The spring D, as shown, may be helical, though it might be flat or of other shape, and these springs are placed between the tire A and the rim E, sitting up against the inner face of the tire and being fastened thereto and against the outer face of rim E and being fastened thereto.

In Fig. 6 the tire A has a lining piece or band A', of metal, against which sit the springs D, and this metal is perforated, as shown in Fig. 11, so that a wire A² may be threaded in and out through the liner or band A' to fasten the springs thereto, or instead of a continuous wire the spring D may be fastened by a threaded wire through the liner or band A', twisted outside, as shown in Fig. 11. The rim E has also a liner or band E', to which the other ends of the springs may be fastened by a threaded wire, as described, or by a twisted wire over each spring, as clearly shown in the drawings. In the modification shown in Fig. 10 the liner or band A' is dispensed with and the spring sits in a circular depression or recess in the tire, its inner end passing through a circular orifice in the liner or band E' of the rim. A hinge-piece E³ takes over that part of the spring which passes into the depression in the tire, and a similar hinge-piece E⁴ takes over that part of the spring which passes through the orifice in the ring E', both said hinge-pieces being locked, say, by a button E⁵ on the opposite end to their hinge.

In the wheel shown in Fig. 8 the rim is shown straight across its face or bottom with its ends turned outwardly at right angles, and just lapping over the ends of these sides of the rim are wide rings A³, fixed to the tire A, so that the rim may have free motion within these rings, and at the same time the rings will prevent the entrance of dust to the springs D. The ring-spokes F may be tangent spokes or other kind of spokes and are fastened to the rim E and to the hub F' and are stretched between these two parts as ordinarily.

In Fig. 3 the band or ring C has a concave footing in which sits a pneumatic ring C', having at its internal periphery a concave seating in the ring C², either bearing on the hub of the wheel, as shown, or otherwise.

Now to prepare this wheel for work—that is to say, for taking weight—the rim E, with its spokes F, is attached to the hub F'. The springs D are fixed in place on the tire and on the band or liner E'. The tire and the spring connections are then inserted in or on the outside of the rim E and the springs D thus brought into compression. The tire-spokes B are then put in place through the oval orifices E⁶, which orifices will allow of plenty of "play" and adjustment, as hereinafter described, and are then screwed in tension (in the ordinary manner) and thus stiffen and brace the tire and make it become an integral part with the band or ring C, and thus become a wheel in itself with flexible connection to the wheel constituted of the rim-spokes F and the hub F'. By regulation of the tire-spokes B, as well understood, the tire may be adjusted so as to sit exactly concentric with the rim E of the hub of the wheel.

The pneumatic ring C, internally of the central stiffening-ring C in the modified construction, Fig. 3, will assist the tire in its movement when traveling over irregularities on or in the roadway.

It will be seen that in passing over inequalities upon the roadway the springs D will compensate for those inequalities and will allow of the tire and the tire-spokes and central ring C to flexibly move without affecting or only very slightly affecting the inner wheel, constituted of the rim E, the rim-spokes, and the hub, and thus very little vibration will be felt by those whom the wheel is supporting.

It is to be understood that though the spring connection between the tire and the rim is described and shown as consisting of helical springs yet this invention is not confined to any kind of spring or flexible connection between the rim and tire, nor is this invention confined to any particular description of inner wheel consisting of rim, rim-spokes, and hub.

Having now particularly described and ascertained the nature of our said invention and in what manner the same is to be performed, we declare that what we claim is—

1. In a vehicle-wheel, the combination with the hub, of a rim, spokes connecting said hub and rim, a wheel-tire surrounding the rim and of greater diameter than the latter, coiled springs interposed between said rim and tire, a ring loosely surrounding the hub, and a second set of spokes connecting said ring and tire, substantially as described.

2. In a vehicle-wheel, the combination with the hub, of a wheel-rim, spokes connecting said hub and rim, a wheel-tire of greater diameter than the rim and surrounding the latter, a plurality of coiled springs interposed between and having their opposite ends attached to the rim and tire, a ring surrounding the hub, a cushion between the ring and hub, and a second set of spokes connecting the wheel-tire and ring, substantially as described.

3. In a vehicle-wheel, the combination with the hub, of a concave wheel-rim, spokes connecting said hub and rim, a wheel-tire of greater diameter than the rim and surrounding the latter, a plurality of coiled springs interposed between, and having their opposite ends secured to said wheel-rim and tire, a ring surrounding the hub, a cushion between said ring and hub, and a second set of spokes adjustably connected to said tire and ring, substantially as described.

4. In a vehicle-wheel, the combination with the hub, of a concave rim, a liner seated within said concave rim, spokes connecting said hub and rim, a wheel-tire of greater diameter than the rim and surrounding the latter, a band secured to said tire, a plurality of coiled springs interposed between, and having their opposite ends secured to said band and liner, a ring surrounding the hub, a cushion between said ring and hub, and a second set of spokes connected to said band and ring, said spokes being passed through slots in the wheel-rim, substantially as described.

5. In a vehicle-wheel, the combination with the hub, of a wheel-rim, spokes connecting said hub and rim, a wheel-tire surrounding the rim, a plurality of springs interposed between, and having their opposite ends secured to said wheel-rim and tire, a ring loosely surrounding the hub, a cushion between said ring and hub, and a second set of spokes connecting said tire and ring substantially as described.

6. In a vehicle-wheel, the combination with the hub, of a flanged rim, a liner seated within the rim, spokes connecting said hub and rim, a wheel-tire surrounding the rim, a band secured to said tire, a plurality of coiled springs interposed between and having their ends secured to said band and liner, a band loosely surrounding the hub, and a second set of spokes connecting said band and ring, said spokes passing through slots in the wheel-rim, substantially as described.

RICHARD THOMAS BELLEMEY.
CHARLES BELLEMEY.

Witnesses:
FRED WALSH,
PERCY NEWELL.